United States Patent [19]

Darling et al.

[11] Patent Number: 6,069,209
[45] Date of Patent: May 30, 2000

[54] COORDINATING RESINS AND USE THEREOF IN SELECTIVELY RECOVERING METALS

[76] Inventors: Graham Darling, 3462 Aylmer Apt. 22, Montréal, P.Q., Canada, H2X 2B6; Lise Hubbard, 599 Manorwood Court, Waterloo Ontario, Canada, N2K 3L4

[21] Appl. No.: 08/857,651

[22] Filed: May 16, 1997

Related U.S. Application Data

[63] Continuation of application No. 08/355,017, Dec. 13, 1994, abandoned.

[30] Foreign Application Priority Data

Dec. 13, 1993 [CA] Canada .................................. 2111287

[51] Int. Cl.[7] ...................................................... C08F 8/34
[52] U.S. Cl. ...................... 525/332.2; 525/348; 525/349; 525/351
[58] Field of Search .......................................... 515/332.2

[56] References Cited

PUBLICATIONS

G.M. Ritcey, *Tailings Management*, Elsevier, Amsterdam (1989).

R.J.C. MacDonald, P.D. Kondos, S. Krevier, P. Rulinsky, N. Wassalouf, "Generation of and disposal options for Canadian mineral industry effluent sludges". *In Tailings and Effluent Managment*. Editors, M.E. Chalkley, B.R. Conard, V.I. Lakshmanan, K.G. Wheeland. Pergamon Press (1989), pp. 139–197.

S. R. Rao, R. Gehr, M. Riendeau, D. Lu, J.A. Finch, "Acid Mine Drainage as a Coagulant". *Minerals Eng.*, 5 (9), 1011 (1992).

B. A. Bolto and L. Pawlowski, *Wastewater Treatment by Ion–Exchange*.

S. R. Rao and J. A. Finch, "Resource recovery from acid mine drainage". In *Waste Processing and Recycling in Mining and Metallurgical Industries*. Editors, S. R. Rao, L. N. Amaratunga, D.A.D. Boateng, M.E. Chalkley. CIM (1992), pp.3–11.

B. A. Bolto and L. Pawlowski, *Wastewater Treatment by Ion–Exchange*. E. & F. N. Spon, New York (1987).

S.R. Rao and J. A. Finch, "A review of water re–use in flotation". *Minerals Eng.*, 2, (1989), pp. 65–85.

J. Holmes and E. Kreusch, *Acid Mine Drainage Treatment by Ion Exchange*. U.S. Enviromental Protection Agency, Washington, D.C. (1972).

B. E. Holbein and A. Blais, "Heavy metal recovery from industrial waste with metal selective adsorbents and high efficiency electrolytic cells". *Proceedings 12th International Symposium on Wastewater Treatment*. pp. 55–76, AQTE, Montréal (1989).

B. E. Holbein and M. J. Noakes, "The use of Aurosave adsorption process for gold and precious metals". *Proc. Aust. inst. Mining Eng.* (1988).

K.M. Mackay and R. A. Mackay, *Introduction to Modern Inorganic Chemistry*, pp. 200–201. Prentice Hall (1989).

W. G. Levine, ed. *The Chelation of Heavy Metals*. Oxford: Pergamon Press, 1979.

J. P. Gao, F. G. Morin, G. D. Darling, "Functional Polymers Containing Dimethylene Spacers. Characterization by Solid–Phase $^{13}$C–NMR," *Macromolecules*, 26, 1196, (1993).

M. Bartholin, G. Boissier, J. Dubois, "Styrene–Divinylbenzene Copolymers, Revisited IR Analysis," *Makromol. Chem*, 182, 2075, (1981).

R. Luhowy, F. Meneghini, "An Improved Synthesis of Aminoethanethiols, " *J. Org. Chem.*, 38, (13), 2405, (1973).

A. H. Martins, "The Extraction of Gold and Silver By Electroelution of Strong–Base Polymeric Resins", *Can. Metallurgical Quarterly*, 32 (1), 85 (1993).

Primary Examiner—Bernard Lipman
Attorney, Agent, or Firm—P. Scott Maclean; Lynn S. Cassan

[57] ABSTRACT

Chelating resins for use in selectively binding heavy metals, having the structure

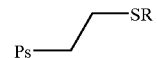

where Ps represents a poly(divinylbenzene), and R represents an organic radical containing at least one N and/or S atoms but not a C—OH group, that is bound to the S atom. The preparation of these chelating resins is also disclosed.

18 Claims, No Drawings

COORDINATING RESINS AND USE THEREOF IN SELECTIVELY RECOVERING METALS

This application is a continuation of application Ser. No. 08/355,017, filed Dec. 13, 1994, now abandoned.

BACKGROUND OF INVENTION

1. Field of the Invention

The present invention relates to new chelating resins and to a process for the treatment of acid mine drainage (AMD) to selectively recover valuable metals, in particular zinc and copper by novel functionalized resins, using the above chelating resins, to obtain discharge water free of toxic metals.

2. Description of Prior Art

Contamination of aqueous effluents by ions of toxic heavy metals poses a serious environmental problem for many industries. For example, Teachings from waste rock piles and mine tailings (called Acid Mine Drainage=AMD) contain various concentrations of zinc, cadmium and copper; selective removal of these metals would not only greatly reduce the environmental hazard of the discharge, but recovery of the valuable metals, along with possible application of the remaining AMD for the coagulation of municipal waters and wastewaters (by the action of Fe and Al ions remaining) [3], could help to finance the treatment process.

Acid mine drainage (AMD), generated wherever sulphide ores are exposed or processed, poses a serious environmental problem [1] as mentioned above. Essentially dilute sulphuric acid, it also contains a number of dissolved metal ions, the most common and abundant being (Fe(II), Fe(III), Al(III), as well as the more toxic heavy metal species (Cu(II), Zn(II), Ni(II) and Mn(II), along with As(III)), in varying concentrations depending on the source. The uncontrolled release of AMD threatens surrounding water resources (whether for ecosystems or human consumption), as well as wasting certain valuable metals which could otherwise be recovered.

Treatment of AMD by lime to neutralize it and precipitate the metals, followed by disposal of the resultant sludge, has been the standard practice [2]. This method does not enable the recovery of metal to be achieved; metal values are lost as metal hydroxide precipitate in the sludge. Moreover, this hydroxide sludge must be treated as hazardous waste. Alternately, metal recovery has the benefit of extending a natural resource and providing some revenue to offset the costs of treatment/disposal while decreasing the sludge volume.

If toxic heavy metals could be selectively removed, the solution of remaining $Fe^{2+}/Fe^{3+}$, $Al^{3+}$, $Mg^{2+}$ etc. could then be used as a source of ferric chloride and alum, which could then be used in municipal wastewater treatment. Raw AMD has been used successfully as a coagulating agent in laboratory experiments [3].

Recovery of metals from AMD has been investigated by selective precipitation, through precise pH control, as (i) metal hydroxides and (ii) metal sulphides. Details of bench scale studies of the two options have been described [4]. A series of investigations aimed at the recovery of zinc from AMD from Mine Gallen have been completed in a joint McGill-Noranda project. Results to date have shown the possibility of recovering a significant proportion of zinc (up to 80%) as zinc sulphide of acceptable grade (55% Zn). However, the economics of this approach still needs to be improved.

Acid Mine Drainage (AMD)—the leaching of toxic and acidic salts (i.e. sulfates of cadmium, lead, mercury, nickel, copper and, particularly, zinc) from exposed mine tailings into the environment—is a major problem across Canada and worldwide. Various industrial processes also generate quantities of toxic heavy metals which, if not intercepted, are released into human and natural environments.

AMD is currently treated by liming (addition of calcium oxide) to precipitate most or all metal cations; however, the large volume of resulting sludge itself needs to be treated as hazardous waste. Alternatively, ion exchange/chelating resins could be used to actually recover the heavy metals and offset treatment and disposal costs. However, most such sorbents currently available are non-selective, thus removing even relatively innocuous and valueless iron, magnesium, and aluminum ions that are also present in large quantities; existing resins are also costly, chemically unstable under conditions of use (pH 2; ex. desulfonation of poly(styrenesulfonate), or cleavage of benzylic functional groups prepared from (chloromethyl)polystyrene), and can themselves be hazardous to manufacture (ex. reagents for chloromethylation of polystyrene are carcinogenic).

As well, acid mine drainage is very acidic (pH 2). The functional groups on most commercially-available polystyrene-based ion exchange resins are either directly bonded to the phenyl ring, or spaced by one carbon group (methylene spacer), making them susceptible to hydrolysis, damaging the resin.

Ion exchange resins are currently manufactured on a multi-ton scale for many applications, including water purification. Most are based on crosslinked polystyrene, Ps—H; (whose mechanical properties make it suitable for use in column beds, etc.) to which various chemical groups have been attached, especially sulphonate, ($Ps$—$SO_3^-Na^+$) and quaternary ammonium ($Ps$-$CH_2N^+Me_3Cl^-$) functionalities for relatively unselective cation- and anion-exchange resins respectively. A wide variety of other chemical groups can also be attached for various applications. Most such "functionalizations" are accomplished by the same route used to make the most common anion-exchange resins: chloromethylation of crosslinked polymer matrix ($Ps$—$H \to Ps$—$CH_2$—$Cl$), followed by substitution of chloride with a nucleophile "X" to give a functional polymer of general structure "$Ps$-$CH_2$-$X$".

Ion-exchange resins are funtionalized polymers that are currently manufactured on a multi-ton scale for many applications, including water purification (ex. deionization). Most such resins are composed of crosslinked polystyrene ("Ps—H", good mechanical properties make it suitable for use in columns, beds, etc.) to which various chemical groups have been attached, especially sulfonate ("$Ps$—$SO_3^{-+}Na$") and quaternary ammonium ("$Ps$—$CH_2$—$NM_{e3}^{+-}Cl$") functionalities for relatively unselective cation- and anion-exchange resins respectively. Many other chemical groups have also been attached to date, for a wide variety of applications; most such "functionalizations" are accomplished by the same route used to make the more common anion-exchange resins: i.e. chloromethylation of the crosslinked polymer matrix ("Ps—H" to "$Ps$—$CH_2$—$Cl$"), followed by substitution of chloride with a nucleophile "X" to give a functional polymer of general structure "$Ps$—$CH_2$—$X$".[3] However, this current route has some problems: first, the chloromethylation step uses carcinogenic reagents; second, the "$Ps$—$CH_2$—$X$" products are often unstable under conditions of their use (ex. in the presence of heat, base and/or nucleophiles), because the connection between functional group and polymer backbone is through a fragile "benzylic" chemical bond.

An ion exchange resin consists of a chemically-inert polymer matrix, such as polystyrene ("Ps"), holding a functional group chemically bound to the polymer backbone. The functional group may be anionic, such as sulphonate, with an exchangeable cationic counter-ion such as sodium (Ps—SO$_3^{-+}$Na), or cationic, such as quaternary ammonium salt, with an anionic mobile counter-ion such as chloride (Ps—CH$_2$NMe$_3^{+-}$Cl). It is the counter-ion which can be exchanged for ions of like charge in solution. Thus, a cation-exchange resin exchanges one cation for another; for example, binding a heavy metal cation while releasing sodium into solution.

A third type of resin, of interest to this project, is a chelating resin. It is sometimes also loosely referred to as a type of ion exchange resin, although it does not necessarily release one ion as it binds another. Chelation (Greek chelae= "claw") takes place when the lone-pair electrons of several electron-rich heteroatoms (O, N, S: "Lewis bases") in the same molecule are able to "coordinate" (form a loose bond) simultaneously to an electron-poor entity (metal cation: a "Lewis acid"), forming a stable structure for an overall strong association (see below). Chelating groups can be very selective for specific ions, according to the identities, numbers and positions of the coordinating heteroatoms. Attaching such a chelation compound to an insoluble powder of crosslinked polymer would allow removal of both chelator and complexed ion from a liquid by simple filtration.

Some Common Chelating Compounds

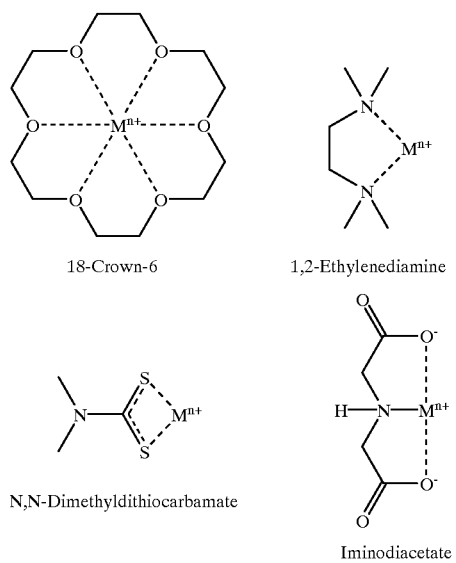

18-Crown-6  1,2-Ethylenediamine

N,N-Dimethyldithiocarbamate  Iminodiacetate

Cation exchange resins have been used extensively as separation tools in process industries. Metal ion species are adsorbed by the resin in exchange for generally Na$^+$ or H$^+$. The process has also been extensively used in the treatment of both municipal and industrial wastewaters [5, 6]. Simple cation exchange resins have also been used for the treatment of acid mine drainage [7]. Being quite unselective, their application however has been limited to the bulk removal of all dissolved metals in order to purify the water (use of cation and anion exchange resins in sequence gives "deionized", similar to "distilled" water). In recent years, new varieties of resins have been synthesized, such as "Chelex-100" (structure 27, FIG. 2c, similar to "iminodiacetate", FIG. 1), which are able to form chelates with adsorbed metal ions [8, 9]. Though relatively inert towards such non-targeted ions as Ca$^{+2}$, Mg$^{+2}$ or Na$^+$ [8], such current commercial chelating resins are less able to discriminate between transition (heavy) metals, such as zinc and iron ions. Nevertheless, these have been used for the recovery of precious metals from the effluents of certain industries [9].

The metals absorbed by such resins can generally be recovered using eluent liquids rich in other cations, such as sodium (e.g. brine) or protons (e.g. nitric and sulphuric acids). The resulting low volume of metal concentrate may be further used or processed in solution form, or the metal ion eventually precipitated as hydroxide, and/or electrodeposited as the element.

Ion exchange/chelating resins are easy to handle, non-toxic, safely transportable, and can be regenerated repeatedly for multiple re-use. The ideal resin should be easy and inexpensive to manufacture; have a high affinity, capacity and selectivity for the target; be easy to recover, regenerate and recycle; be mechanically and chemically stable to the conditions of its use and regeneration. Crosslinked polystyrene is a proven inert and stable matrix for ion exchange resins and other functional polymers for many applications, and is particularly appropriate for columns of all sizes. The design for a zinc-versus-iron-selective sorbent thus depends on the choice of an appropriate chelating functional group.

Most commercial resins are based on crosslinked polystyrene, Ps-H; (whose mechanical properties make it suitable for use in column beds, etc.) to which various chemical groups have been attached, especially sulphonate (Ps-SO$_3^-$Na$^+$) and quaternary ammonium (Ps—CH$_2$N$^+$Me$_3$Cl$^-$) functionalities for cation and anion exchange resins respectively. Such functional groups are relatively unselective. Selective functional groups can be introduced to prepare ion exchange resins for the selective uptake of specific metals. The principle determining selectivity which is used in the present work is hard/soft formalism [10]. In this, metal ions are classified as hard or soft "Lewis acids" (electron donors) and the ligand (functional group) as hard or soft "Lewis bases" (electron acceptors). A ligand is a hard (Lewis) base if it is non-polarizable and is a soft base if it is polarizable. Sulphur and phosphorus-containing ligands are polarizable and therefore soft. Oxygen is harder, and the oxygen-containing carboxylate and hydroxyl groups are consequently hard ligands. A metal ion is a soft (Lewis) acid if it has easily polarizable electrons, or has a low charge, while a hard metal ion has high charge or valence electrons which are not polarizable. The "HSAB" (Hard-Soft-Acid-Base) rule states that soft ligands tend to form complexes with soft metal ions, and hard ligands form complexes with hard ions.

According to this classification Fe(III) ion is hard and not complexed with a soft ligand. Zn(II) ion is relatively soft and can be complexed with a soft ligand. On this basis ion exchange resins containing soft ligands are potentially selective to remove zinc leaving ferric ions in solution. The chelating groups of interest will have sulphur and possibly nitrogen in them (nitrogen is slightly soft). The sulphur-containing groups will be in the form of thiols, possibly also having thiolates, thioketones, thioethers, thiazoles, etc., in the chelant. The nitrogen groups will be in the form of amines, which are protonated at low pH's, resulting in positively-charged, hydrophilic groups which can make the resin more hydrophilic (wettable). Other nitrogen-containing functionalities such as ringed structures (e.g. pyridine) may be included. Since oxygen-containing chelants have a tendency to complex iron, these should be avoided.

Ligands which prefer to bind zinc over iron are also likelier to bind other soft cations, such as those of cadmium, lead, mercury, silver, copper, gold, etc.—all of which are toxic and/or valuable.

As well as being selective for the metal(s) of choice, it is important to have chelating functional groups which are non-hydrolyzable (stable to acid), and which are strongly bonded to the polymer backbone, so that they are not removed during usage.

Much work has been done in the past on finding metal-selective chelating groups. Generally the areas of development are analytical chemistry and biomedical applications (metal poisoning treatments) [11]. The work done in these fields will be useful in the development of metal-selective chelating resins.

SUMMARY OF INVENTION

It is an object of the present invention to provide new functional polymers, which can be prepared by a new non-toxic and economical free-radical polymer modification technique and which are able to selectively bind, through chelation, toxic and valuable heavy metals such as zinc, in preference to others which are less valuable and toxic such as iron, out of acid mine drainage.

It is another object of the present invention to provide chelating polymers which exhibit superior selectivity and capacity for zinc, better than currently available commercial resins, and still at anticipated low cost.

It is another object of the present invention to provide a heavy-metal-selective chemically stable economical sorbent which would not be "fouled" by non-targeted ions, could allow recovery of valuable metals, would be recyclable for multiple re-use, and could also be useful for hydrometallurgy or water analysis.

It is still another object of the present invention to enable iron and other polyvalent ions still remaining in the eluent to be useful to coagulate municipal or other organic wastewaters.

It is another object of the present invention to provide a new family of polymer-supported chelating groups, which are easily and economically prepared by a new non-carcinogenic process, that are able to selectively remove the more toxic and valuable heavy metal ions from water without being "fouled" by less hazardous/valuable elements also present but not requiring removal.

It is another object of the present invention to provide a process for preparing sturdy new crosslinked resins, which are easily permeated by water and are resistant to chemical and mechanical breakdown, which contain functional groups composed of electronically "soft" nucleophilic centers (sulfur and nitrogen, in contrast to "hard" oxygen).

It is another object of the present invention to enable nucleophilic centers that are capable of selectively and strongly coordinating to "softer" (and generally more toxic, and more valuable) ions of metals such as Cd, Zn, Cu, Hg, etc. in preference to and in the presence of "harder" ions of Fe, Al, Na, etc., thus protecting the resins from "fouling" by the latter.

It is another object of the present invention to enable these resins to be recycled and reused after being stripped of the bound metals, yielding a concentrate suitable for further separation/isolation, through a simple wash with strong acid.

It is another object of the present invention to provide chelating resins which through their mechanical and chemical features are applicable to other problems in a variety of metal-related industries, including capture and recovery of mercury, from electrochemical processes, concentration of species for assay and analysis, etc.

It is another object of the present invention to provide an alternate means, both more economical and safer (less carcinogenic), of preparing functionalized polymers of general structure "Ps—$CH_2$-$CH_2$-X" which are both chemically more stable, and better able to interact (to bind) with dissolved species in a permeating liquid, which resins have the following desirable features: selectivity for desirable metals (and rejection of undesirable ones, such as Fe; resistance to low pH; ability to regenerate the resins by inexpensive and environmentally friendly solutions.

It is another object of the present invention to provide a process for preparing a chelating resin by forming a poly (divinylbenzene) from a divinylbenzene/ethyl styrene mixture, and attaching a SR group to the poly (divinylbenzene).

DESCRIPTION OF PREFERRED EMBODIMENTS

4. Experimental 4.1 Synthetic Techniques 4.1a Radical Suspension Polymerization of Divinyl Benzene Using standard methodologies [12], divinylbenzene was polymerized to form macroporous beads of poly (divinylbenzene).

Procedure:

50 g of commercial 55:45 divinylbenzene/ethyl styrene mixture was stirred at 1000 rpm in 500 mL distilled water, 50 mL toluene, and 0.25 g of cellulose ether (Dow Methocel K100LV). 0.5 g of a radical initiator, AIBN (2,2'-azobis-(isobutyronitrile)) was added, the system flushed with nitrogen, and the mixture heated to 70° C.

After 2 hours, g of benzoquinone was added to quench the reaction. Once cool, the resin was filtered and washed with toluene, then acetone, purified by Soxlet extraction using acetone, and then dried under vacuum. The yield was 78%.

The resin was characterized using infrared spectrometry, and the degree of functionalization (df, the number of residual double bonds per total number of repeating units) calculated therefrom [13].

The chemical structure of poly(divinylbenzene) (polyDVB) is as follows:

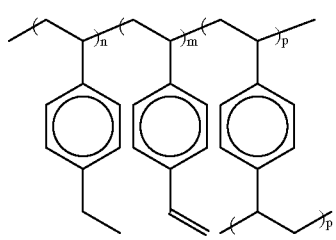

The structure of polyDVB will be abbreviated as follows:

4.1b Functionalization of Poly(Divinylbenzene)

It is possible to attach different functional groups to the vinyl group of the poly(divinylbenzene) using different methodologies. The method used in this study is radical-catalyzed anti-Markovnikov addition of thiols [12]. This method is new and unique to this research group. It is cheap, convenient, and avoids the use of chloromethylation of the polymer. As well, it creates a very stable connection of the functional group through a non-benzylic (two carbon unit) bond. Thiols and sulphides are sulphur-containing soft Lewis bases which would tend to have an affinity for the softer metals, such as zinc. It is through the sulphide-functionality that the compound is chemically attached to the polyDVB during functionalization.

Procedure:

Alternatively, the thiol can be added before adding benzoquinone for the same result.

In a 50 mL 2-necked round-bottom flask equipped with stirring bar and condenser, 2 g of polyDVB (2.29 mmol double bonds/g resin) was mixed with approximately 30 mL compatible solvent, 1–2 wgt % AIBN (0.02–0.04 g) and excess thiol of choice (1.5 equivalents). The mixture was flushed with nitrogen, stirred, and heated to 70° C. The reaction was allowed to run between 6 and 24 hours. Afterward, the resin was filtered, rinsed with various solvents, and dried under vacuum.

The solvents used for the reaction were toluene and dioxane; other solvents still to be tried include tetrahydrofuran, N,N-dimethylformamide, dimethylsulphoxide, and acetonitrile. The solvent used must be hydrophobic enough to swell the polymer, and be able to dissolve the thiol in order to transport it into the swollen polymer to maximize functionalization.

The functional capacity of the resin (df, the number of functional groups per mass of resin in mmol/g) was found using elemental sulphur analysis.

4.1c Synthesis of New Thiols

In view of the promising results obtained with structure 20 (see discussion), further polymer-supported aminoethyl-sulphides are proposed. These will be prepared through radical-catalyzed polymer functionalization as described above with either aminoethanethiols that are already commercially available (28, 29, 30), or with new ones prepared from amines of interest (inexpensive, poly-coordinating, and/or cyclic: 31–37, for example) by a variation of an established method using ethylene sulphide (episulphide) and a silver salt [14]. It may also be possible to substitute other, less expensive soft metal ions, such as $Cu^+$, for $Ag^+$. There may also be alternative synthetic routes which may be investigated in the future.

Procedure:

In a 250 mL single-necked round-bottom flask, equipped with stirring bar, and sealed with a rubber septum, 14 mL of triethylamine (0.10 mol) and 50 mL of distilled water are added. A solution of 8.5 g silver(l)nitrate ($AgNO_3$) or 8.4 g silver(l)acetate ($CH_3COO^-Ag^+$) (0.05 mol, 1 eq., $Ag^+$) in 15 mL distilled water is added, followed by 0.10 mol of the amine of choice (2 eq.).

The system is kept at 0° C. and flushed with nitrogen. 3 mL (0.05 mol, 1 eq.) of ethylene sulphide is added dropwise, and the reaction stirred for a minimum of 1.5 hours.

Following this, the resulting silver complex is filtered off and washed with cold distilled water. The complex is then re-suspended in 75 mL of water, stirred, and (our modification of the procedure, which originally used hydrogen sulphide gas ($H_2S$)) a solution of 11.2 g (0.075 mol, 1.5 eq.) of sodium iodide (NaI) in 50 mL of 50% acetic acid is added to liberate the free thiol from the silver complex. The amino-thiol is then extracted using an organic solvent, such as methylene chloride ($CH_2Cl_2$) or diethyl ether ($CH_3CH_2OCH_2CH_3$).

FIG. 3 lists some aminoethanethiols and the corresponding resins to be synthesized from commercially-available amines using this method.

Figure 3:
Proposed Polymer Structures 31–37 (From New Thiols)

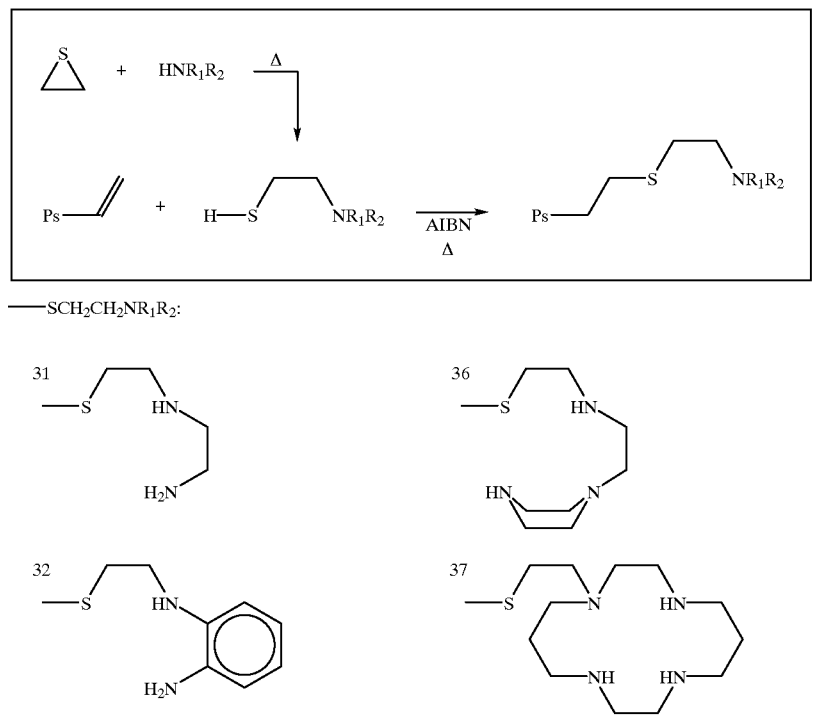

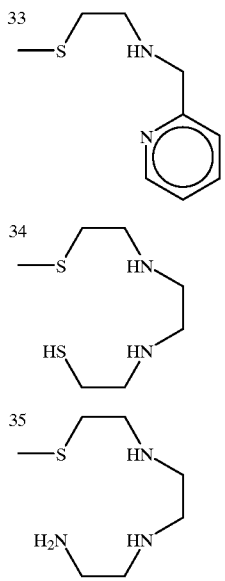

4.2 Simulated Acid Mine Drainage

The entire work was carried out with a synthetic AMD solution of composition close to that of "les Mines Gallen" AMD. This was chosen as the earlier work on the recovery of zinc by selective precipitation had also been conducted with AMD from "les Mines Gallen". The synthetic AMD was prepared by dissolving calculated amounts of the sulphates of various metals, and sodium arsenite (for arsenic) in one liter of water. The composition of the solution is recorded in Table 1.

TABLE 1

Composition of "Synthetic" AMD

| Metal Ion | $Fe^{+2}$ | $Fe^{+3}$ | $Cu^{+2}$ | $Zn^{+2}$ | $Al^{+3}$ | $Mn^{+2}$ | $Mg^{+2}$ | $Cd^{+2}$ | $As^{+3}$ |
|---|---|---|---|---|---|---|---|---|---|
| Concentration (g/L) | 2.70 | 3.52 | 0.04 | 3.06 | 0.70 | 0.03 | 0.64 | 0.01 | 0.01 |
| (mmol/L) | 48.3 | 63.0 | 0.63 | 46.8 | 25.9 | 0.55 | 26.0 | 0.09 | 0.13 |

The pH of the product was 2.1.

The solution was periodically (twice a week) flushed with nitrogen to minimize the oxidation of Fe(II) to Fe(III).

4.3 Treatment Procedure and Analysis

A weighed quantity of ground ion exchange/chelating resin containing approximately 0.250 mmol of functional groups was put into a 10 mL polyethylene bottle, a measured volume of AMD was added and the contents were mixed at room temperature using a platform shaker. After the required time of shaking, the contents were allowed to settle; centrifuging was used wherever necessary. A 5 µL solution was withdrawn, diluted to 10 mL (dilution factor of 2000) and analyzed for Fe, Zn and Mg by atomic absorption spectroscopy.

In the first set of experiments, 5 mL AMD was treated using this method, and analyses for the metals were conducted after. 1, 2, 4, 6 and 22 hours in order to establish the time required to reach equilibrium. This would then be used as the treatment time in the remaining experiments.

In the second set of experiments, the quantity of AMD treated was varied. Each resin was studied with 1.5 mL, 3.0 mL and 5.0 mL of AMD.

A third set of experiments was conducted, identical to the second, but in which the ferrous (+2) iron of AMD was oxidized to the ferric (+3) state by treatment with a stoichiometric amount of hydrogen peroxide before the AMD's treatment with the resin.

The fourth set of experiments involved attempting to extract the adsorbed zinc from selected resins. Currently, only sulphuric acid has been used, though nitric acid, aqueous EDTA (ethylenediaminetetraacetic acid) and DTPA (diethylene-triaminepentaacetic acid) (these last two are water-soluble chelants), and other eluents are contemplated. The resin, previously treated with 5 mL of AMD, was rinsed with distilled water to remove any residual AMD, then soaked in 20 mL of 4 molar sulphuric acid. The amount of metal that was released by the resin was then measured.

Qualitative observations of the wettability of some of the resins were noted during the other tests. A resin was considered not wettable if it would creep up the side of the bottle while mixed with the AMD solution. It was considered partially wettable if it tended to stay at the air-water interface, and wettable if it mixed well with the AMD solution.

The resins were evaluated using the following criteria. The weight capacity, or loading, C) of each resin, which is the amount of metal ion (mg or mmol) adsorbed by 1 g or dry resin, was found. The adsorption of metal ions was indirectly measured using the difference of the initial and final concentrations of the metals in solution (measured using atomic adsorption spectrometry). Since the degree of functionalization (df) varied from resin to resin, the metal uptake was also calculated in mmol metal/mmol fg.

The distribution coefficient, D, measures the partitioning of the metal between the resin and the solution. It is a solution-dependent value. D is found by dividing the loading (mmol/g resin) by the concentration at equilibrium (mmol/L). D is measured in g resin/L solution.

D=loading (mmol $M_1$/g resin)/[$M_1$ (aq)]

The selectivity of the resins for zinc over iron was determined by calculating the separation factor, $S_{Zn/Fe}$. Also solution-dependent, it is the ratio of the distribution coefficient for zinc to that of iron.

$$S_{Zn/Fe} = D_{Zn}/D_{Fe}$$

$$S_{M_1/M_2} = \frac{\text{loading (mmol } M_1 / g \text{ resin}) \times [M_2 \text{ (aq)}]}{\text{loading (mmol } M_2 / g \text{ resin}) \times [M_1 \text{ (aq)}]}$$

$M_1$ is zinc, $M_2$ is iron. The separation factor is unitless.

When the separation factor is high, the resin is selective for zinc; when this ratio is small, the resin is selective for iron. The higher $S_{Zn/Fe}$ is, the more selective the resin is for zinc. The goal of this project is to develop resins with a high selectivity for zinc over iron.

The mass of each resin to be tested, corresponding to 0.25 mmol, was calculated from a knowledge of the functional capacity (amount of functional groups) of that resin, using the formula:

$$\text{Mass of the resin (g)} = (0.25 \text{ mmol}) \Big/ \text{(functional capacity)} \\ \text{(mmol fg/g)}$$

It was expected that each functional group in the resin would chelate one metal ion. 1.25 mL of synthetic AMD contains 0.25 mmol of all metal ions, while 6 mL of the same contains that amount of zinc alone.

Due to limited quantites of resin, some resins tested had less than 0.25 mmol of functional (chelating) groups.

5. Results 5.1 Equilibrium Time

The results recorded in Table 2 show the uptake of metals by four resins with increasing treatment time. It is noted that there is no significant increase in metal uptake after 2 hours, even in resins that were observed to be only partially wettable (Table 6). Consequently, all later test used a treatment time of between 4 and 6 hours.

TABLE 2

Metal Uptake versus Time from 5 mL AMD by Selected Resins

| Resin | Quantity (g) | Time (hours) | Metal Uptake (mmol/mmol fg) | | | Capacity (C) (mmol/g) | | |
|---|---|---|---|---|---|---|---|---|
| | | | Fe | Zn | Mg | Fe | Zn | Mg |
| 1 | 0.625 | 1 | 0.03 | 0.18 | 0.07 | 0.01 | 0.07 | 0.03 |
| | | 2 | 0.07 | 0.27 | 0.08 | 0.02 | 0.1 | 0.04 |
| | | 4 | 0.07 | 0.27 | 0.08 | 0.02 | 0.1 | 0.04 |
| | | 6 | 0.07 | 0.27 | 0.08 | 0.02 | 0.1 | 0.04 |
| | | 22 | 0.07 | 0.27 | 0.08 | 0.02 | 0.1 | 0.04 |
| 2 | 0.250 | 1 | 0.13 | 0.19 | 0.05 | 0.13 | 0.19 | 0.05 |
| | | 2 | 0.16 | 0.26 | 0.07 | 0.16 | 0.26 | 0.07 |
| | | 4 | 0.19 | 0.29 | 0.07 | 0.18 | 0.27 | 0.07 |
| | | 6 | 0.19 | 0.29 | 0.07 | 0.18 | 0.27 | 0.07 |
| | | 22 | 0.19 | 0.29 | 0.07 | 0.18 | 0.27 | 0.07 |
| 3 | 0.175 | 1 | 0.12 | 0.18 | 0.09 | 0.18 | 0.27 | 0.13 |
| | | 2 | 0.22 | 0.21 | 0.10 | 0.33 | 0.31 | 0.15 |
| | | 4 | 0.24 | 0.24 | 0.12 | 0.34 | 0.33 | 0.18 |
| | | 6 | 0.24 | 0.24 | 0.12 | 0.34 | 0.33 | 0.18 |
| | | 22 | 0.24 | 0.24 | 0.12 | 0.34 | 0.33 | 0.18 |
| 4 | 0.179 | 1 | 0.12 | 0.19 | 0.08 | 0.17 | 0.27 | 0.11 |
| | | 2 | 0.17 | 0.26 | 0.08 | 0.22 | 0.36 | 0.11 |
| | | 4 | 0.17 | 0.28 | 0.09 | 0.22 | 0.39 | 0.13 |
| | | 6 | 0.17 | 0.28 | 0.09 | 0.22 | 0.39 | 0.13 |
| | | 22 | 0.17 | 0.28 | 0.09 | 0.22 | 0.39 | 0.13 |

5.2 Metal Uptake by Different Resins

The uptake of metals from unoxidized AMD (ferrous ion present) by different resins is recorded in Table 3. For most of the resins the data show the uptake with 1.5, 3.0 and 5.0 mL of AMD. In some cases experiments could be done only with 5.0 mL of solution since with the lower volumes difficulty in solid-liquid separation precluded analysis of the solution. (Note: For resins 14 and 15, the functional capacities were not available, so uptakes were only expressed per gram of resin).

TABLE 3

Metal Uptake versus Functional Group

| Resin | Quantity (g) | Volume AMD (mL) | Metal Uptake (mmol/mmol fg) | | | Capacity (C) (mmol/g) | | |
|---|---|---|---|---|---|---|---|---|
| | | | Fe | Zn | Mg | Fe | Zn | Mg |
| 1 | 0.625 | 5.0 | 0.07 | 0.27 | 0.075 | 0.02 | 0.10 | 0.03 |
| 2 | 0.250 | 1.5 | 0.09 | 0.08 | 0.05 | 0.09 | 0.08 | 0.05 |
| | | 3.0 | 0.13 | 0.15 | 0.11 | 0.13 | 0.15 | 0.11 |
| | | 5.0 | 0.19 | 0.29 | 0.07 | 0.18 | 0.27 | 0.07 |
| 3 | 0.175 | 1.5 | 0.02 | 0.08 | 0.05 | 0.03 | 0.12 | 0.08 |
| | | 3.0 | 0.15 | 0.16 | 0.08 | 0.22 | 0.23 | 0.12 |
| | | 5.0 | 0.24 | 0.24 | 0.12 | 0.34 | 0.33 | 0.18 |
| 4 | 0.179 | 1.5 | 0.05 | 0.09 | 0.06 | 0.07 | 0.12 | 0.08 |
| | | 3.0 | 0.08 | 0.13 | 0.07 | 0.11 | 0.18 | 0.10 |
| | | 5.0 | 0.17 | 0.28 | 0.09 | 0.23 | 0.39 | 0.13 |
| 5 | 0.250 | 1.5 | 0.05 | 0.08 | 0.05 | 0.05 | 0.08 | 0.05 |
| | | 3.0 | 0.13 | 0.15 | 0.08 | 0.13 | 0.15 | 0.08 |
| | | 5.0 | 0.36 | 0.23 | 0.12 | 0.35 | 0.21 | 0.12 |
| 6 | 0.385 | 5.0 | 0.32 | 0.28 | 0.09 | 0.05 | 0.17 | 0.06 |
| 7 | 0.203 | 1.5 | 0.11 | 0.09 | 0.06 | 0.13 | 0.11 | 0.07 |
| | | 3.0 | 0.18 | 0.16 | 0.08 | 0.22 | 0.20 | 0.10 |
| | | 5.0 | 0.41 | 0.26 | 0.11 | 0.49 | 0.30 | 0.14 |
| 8 | 0.455 | 5.0 | 0.39 | 0.34 | 0.13 | 0.21 | 0.17 | 0.07 |
| 9 | 0.357 | 5.0 | 0.66 | 0.29 | 0.11 | 046 | 0.19 | 0.08 |
| 10 | 0.203 | 5.0 | 0.19 | 0.29 | 0.10 | 0.22 | 0.32 | 0.12 |
| 11 | 0.310 | 5.0 | 0.02 | 0.07 | 0.02 | 0.07 | 0.22 | 0.07 |
| 12 | 0.147 | 1.5 | 0.32 | 0.12 | 0.08 | 0.67 | 0.26 | 0.16 |
| | | 3.0 | 0.32 | 0.20 | 0.10 | 0.68 | 0.41 | 0.21 |
| | | 5.0 | 0.66 | 0.37 | 0.17 | 1.11 | 0.60 | 0.36 |
| 13 | 0.147 | 1.5 | 0.07 | 0.03 | 0.02 | 0.45 | 0.17 | 0.12 |
| | | 3.0 | 0.06 | 0.05 | 0.03 | 0.39 | 0.34 | 0.19 |
| | | 5.0 | 0.10 | 0.07 | 0.04 | 0.64 | 0.41 | 0.28 |
| 14 | 0.147 | 1.5 | | | | 0.82 | 0.18 | 0.05 |
| | df NA | 3.0 | | | | 1.10 | 0.27 | 0.14 |
| | | 5.0 | | | | 1.15 | 0.33 | 0.21 |
| 15 | 0.147 | 1.5 | | | | 0.45 | 0.13 | 0.06 |
| | df NA | 3.0 | | | | 0.42 | 0.28 | 0.48 |
| | | 5.0 | | | | 0.73 | 0.40 | 0.21 |
| 16 | 0.11 | 5.0 | 0.26 | 0.31 | 0.12 | 0.55 | 0.64 | 0.27 |
| 17 | 0.22 | 5.0 | 0.68 | 1.02 | 0.39 | 0.27 | 0.36 | 0.22 |
| 18 | 0.13 | 5.0 | 0.51 | 0.54 | 0.20 | 0.69 | 0.69 | 0.38 |
| 19 | 0.22 | 5.0 | 0.11 | 0.56 | 0.19 | 0.50 | 0.41 | 0.22 |
| 20 | 0.20 | 5.0 | 0.17 | 6.2 | 2.3 | 0.05 | 0.45 | 2.27 |
| 21 | 0.33 | 5.0 | 1.77 | 0.78 | 0.39 | 0.45 | 0.18 | 0.15 |
| 22 | 0.39 | 5.0 | 0.77 | 0.17 | 2.6 | 0.15 | 0.03 | 0.82 |
| 23 | 0.20 | 5.0 | 3.6 | 5.1 | 1.7 | 0.45 | 0.40 | 0.20 |
| 24 | 0.16 | 5.0 | 46 | 12 | 31 | 0.44 | 0.06 | 0.31 |
| 25 | 0.50 | 5.0 | 0.05 | 0.73 | 0.21 | 0.02 | 0.12 | 0.06 |
| 26 | 0.307 | 5.0 | 0.02 | 0.32 | 0.47 | 0.0 | 0.60 | 0.38 |

5.3 Metals Uptake by Resins after Oxidizing the AMD

Table 4 shows the uptake of metal ions by selected resins from AMD which was treated with hydrogen peroxide to oxidize all ferrous iron to the ferric state. Otherwise, conditions were the same as for Table 3.

TABLE 4

Metal Uptake versus Functional Group (All Fe as Fe(III))
5 mL AMD, 6 hour equilibrium time

| Resin | Quantity (g) | Metal Uptake (mmol/mmol fg) | | | Capacity (C) (mmol/g) | | |
|---|---|---|---|---|---|---|---|
| | | Fe | Zn | Mg | Fe | Zn | Mg |
| 2 | 0.250 | 0.05 | 0.28 | 0.04 | 0.01 | 0.07 | 0.04 |
| 5 | 0.250 | 0.15 | 0.27 | 0.04 | 0.04 | 0.06 | 0.04 |
| 8 | 0.455 | 0.08 | 0.24 | 0.05 | 0.02 | 0.05 | 0.03 |

TABLE 4-continued

Metal Uptake versus Functional Group (All Fe as Fe(III))
5 mL AMD, 6 hour equilibrium time

| Resin | Quantity (g) | Metal Uptake (mmol/mmol fg) | | | Capacity (C) (mmol/g) | | |
|---|---|---|---|---|---|---|---|
| | | Fe | Zn | Mg | Fe | Zn | Mg |
| 9  | 0.357 | 0.99 | 0.32 | 0.07 | 0.24 | 0.07 | 0.05 |
| 10 | 0.203 | 0.15 | 0.30 | 0.02 | 0.04 | 0.07 | 0.02 |
| 11 | 0.310 | 0.05 | 0.07 | 0.01 | 0.03 | 0.07 | 0.03 |
| 12 | 0.147 | 0.18 | 0.30 | 0.02 | 0.03 | 0.05 | 0.03 |
| 14 | 0.147 |      |      |      | 0.14 | 0.09 | 0.06 |
|    | df NA |      |      |      |      |      |      |
| 16 | 0.11  | 0.30 | 0.35 | 0.12 | 0.64 | 0.73 | 0.27 |
| 17 | 0.22  | 0.14 | 0.92 | 0.32 | 0.05 | 0.32 | 0.18 |
| 18 | 0.13  | 0.16 | 0.56 | 0.20 | 0.23 | 0.69 | 0.38 |
| 19 | 0.22  | 0.64 | 0.60 | 0.23 | 0.09 | 0.45 | 0.27 |
| 20 | 0.20  | 0.28 | 5.9  | 2.3  | 0.05 | 0.45 | 0.27 |
| 21 | 0.33  | 1.23 | 0.66 | 0.24 | 0.30 | 0.15 | 0.09 |
| 22 | 0.39  | 2.86 | 0.70 | 0.25 | 0.62 | 0.15 | 0.08 |
| 23 | 0.20  | 5.6  | 5.5  | 2.5  | 0.44 | 0.06 | 0.38 |
| 24 | 0.16  | 46   | 6    | 38   | 0.44 | 0.06 | 0.38 |
| 25 | 0.50  | 0.05 | 0.57 | 0.21 | 0.02 | 0.10 | 0.06 |
| 26 | 0.31  | 0.02 | 0.34 | 0.43 | 0.0  | 0.55 | 0.35 |
| 27 | 0.2   | 2.36 | 0.76 | 0.25 | 1.65 | 0.53 | 0.31 |

5.4 Recovery of Zinc

The results obtained by treating selected resins with 20 mL of 4 molar sulphuric acid in order to recover the adsorbed zinc are given in Table 5.

TABLE 5

Zinc Recovery From Selected Resins

| Resin | Amount Resin (dry weight) (g) | Amount Zinc Adsorbed (mg) | Amount Zinc Released (mg) | Percent Recovery |
|---|---|---|---|---|
| 19[a] | 0.22 | 5.90 | 5.00 | 84.7 |
| 19[b] | 0.22 | 5.88 | 5.00 | 85.0 |
| 20[a] | 0.20 | 6.47 | 5.20 | 80.4 |
| 20[b] | 0.20 | 5.88 | 5.00 | 85.0 |

[a]AMD with $Fe^{+2}$ and $Fe^{+3}$
[b]AMD with $Fe^{+3}$

5.5 Wettabilty of Resins

The following table consists of qualitative observations pertaining to the hydrophilicity of some of the resins while undergoing the testing with AMD solution.

TABLE 6

Wettability of Resins

| Resin | Wettable | Partially Wettable | Poorly Wettable |
|---|---|---|---|
| 1  |   | X |   |
| 2  | X |   |   |
| 3  | X |   |   |
| 4  |   | X |   |
| 5  | X |   |   |
| 6  |   | X |   |
| 7  | X |   |   |
| 8  |   | X |   |
| 9  |   | X |   |
| 10 |   | X |   |
| 11 |   | X |   |
| 16 |   | X |   |
| 17 |   | X |   |
| 18 |   | X |   |
| 19 |   | X |   |
| 20 |   | X |   |
| 21 |   | X |   |
| 22 |   | X |   |
| 23 |   | X |   |
| 24 |   | X |   |
| 25 |   | X |   |
| 26 |   |   | X |
| 27 | X |   |   |

5.6 Selectivity of Resins for Zinc over Iron

As shown in table 7, the selection factor (Zn:Fe) for each resin using 5 mL AMD was calculated with the method mentioned in section 4.3 ($S_{Zn/Fe}=D_{Zn}/D_{Fe}$). It is desirable to have a large separation factor ($S_{Zn/Fe}$). This means that the resin is selective for zinc over iron. As some of the final (equilibrium) iron concentrations were close and possibly equal to the initial concentration, within the detection limits of the atomic absorption method used to measure them, error on the large $S_{Zn/Fe}$ values marked with an asterisk is itself quite large; more accurate values will be obtained in future experiments by measuring bound metals directly, following digestion of the polymer, instead of by difference as was done here. The ratio of the capacities (C, in mmol metal/g resin) for zinc and iron was also calculated. It is desirable to have a large $C_{Zn}/C_{Fe}$.

TABLE 7

Distribution Coefficients, Capacity Ratios and Zn/Fe Separation Factors ($S_{Zn/Fe}$)

| Resin | $D_{Zn}$ Mixed Fe(II)/Fe(III) ($\times 10^{-3}$) | $D_{Zn}$ Fe(III) Only ($\times 10^{-3}$) | $D_{Fe}$ Mixed Fe(II)/Fe(III) ($\times 10^{-3}$) | $D_{Fe}$ Fe(III) Only ($\times 10^{-3}$) | $C_{Zn}/C_{Fe}$ Mixed Fe(II)/Fe(III) | $C_{Zn}/C_{Fe}$ Fe(III) Only | $S_{Zn/Fe}$ Mixed Fe(II)/Fe(III) | $S_{Zn/Fe}$ Fe(III) Only |
|---|---|---|---|---|---|---|---|---|
| 1 | 2.3 |     | 0.2 |     | 4.2 |     | 10.0 |      |
| 2 | 6.3 | 6.1 | 1.7 | 0.5 | 1.6 | 5.3 | 3.7  | 12.6 |
| 3 | 7.7 |     | 3.1 |     | 1.0 |     | 2.5  |      |
| 4 | 8.9 |     | 2.2 |     | 1.7 |     | 4.2  |      |
| 5 | 5.0 | 5.7 | 3.2 | 1.4 | 0.7 | 1.8 | 1.6  | 4.2  |
| 6 | 3.9 |     | 1.8 |     | 0.9 |     | 2.1  |      |
| 7 | 6.8 |     | 4.5 |     | 0.6 |     | 1.5  |      |
| 8 | 3.9 | 2.8 | 1.9 | 0.4 | 0.9 | 3.0 | 2.1  | 7.1  |

TABLE 7-continued

Distribution Coefficients, Capacity Ratios and Zn/Fe Separation Factors ($S_{Zn/Fe}$)

| Resin | $D_{Zn}$ Mixed Fe(II)/Fe(III) (×10⁻³) | $D_{Zn}$ Fe(III) Only (×10⁻³) | $D_{Fe}$ Mixed Fe(II)/Fe(III) (×10⁻³) | $D_{Fe}$ Fe(III) Only (×10⁻³) | $C_{Zn}/C_{Fe}$ Mixed Fe(II)/Fe(III) | $C_{Zn}/C_{Fe}$ Fe(III) Only | $S_{Zn/Fe}$ Mixed Fe(II)/Fe(III) | $S_{Zn/Fe}$ Fe(III) Only |
|---|---|---|---|---|---|---|---|---|
| 9  | 4.4  | 4.7  | 4.1  | 6.2  | 0.5 | 0.3 | 1.1 | 0.8 |
| 10 | 7.5  | 7.8  | 2.1  | 1.7  | 1.5 | 2.0 | 3.6 | 4.7 |
| 11 | 5.0  | 5.3  | 0.7  | 1.4  | 3.1 | 1.6 | 7.4 | 3.7 |
| 12 | 13.6 | 10.8 | 10.1 | 2.7  | 0.6 | 1.7 | 1.4 | 4.0 |
| 13 | 9.4  |      | 5.9  |      | 0.7 |     | 1.6 |     |
| 14 | 7.7  | 14.1 | 10.4 | 8.9  | 0.3 | 0.7 | 0.7 | 1.6 |
| 15 | 9.1  |      | 6.7  |      | 0.6 |     | 1.4 |     |
| 16 | 15.3 | 16.9 | 5.4  | 6.1  | 1.2 | 1.2 | 2.8 | 2.8 |
| 17 | 8.5  | 7.6  | 2.4  | 0.5  | 1.5 | 6.8 | 3.6 | 16  |
| 18 | 15.6 | 16.1 | 6.2  | 1.9  | 1.1 | 3.5 | 2.5 | 8.4 |
| 19 | 9.6  | 10.3 | 0.8  | 4.6  | 5.0 | 0.9 | 11.9 | 2.2 |
| 20 | 10.5 | 10.1 | 0.1  | 0.2  | 36  | 21  | 87* | 50* |
| 21 | 4.4  | 3.7  | 4.1  | 2.9  | 0.4 | 0.5 | 1.1 | 1.3 |
| 22 | 0.8  | 3.3  | 1.5  | 5.6  | 0.2 | 0.2 | 0.5 | 0.6 |
| 23 | 8.7  | 9.4  | 2.6  | 4.0  | 1.4 | 1.0 | 3.3 | 2.3 |
| 24 | 2.6  | 2.2  | 4.2  | 4.2  | 0.3 | 0.2 | 0.6 | 0.5 |
| 25 | 3.0  | 2.3  | 0.1  | 0.1  | 15  | 12  | 37* | 29* |
| 26 | 5.5  | 5.9  | 0.1  | 0.1  | 18  | 19  | 42* | 45* |
| 27 |      | 11.4 |      | 14.8 |     | 0.3 |     | 0.8 |

6. Discussion and Future Work 6.1 Equilibrium Time

As can be seen in Table 2 (section 5.1), the time for zinc uptake to reach its maximum was between 2 and 4 hours, depending on the resin. As a result, all tests had between 4 and 6 hour treatment times, which is estimated to have allowed all systems sufficient time to reach equilibrium. On a large scale, a high mixing efficiency could allow a 2 hour treatment to be sufficient.

6.2 Effect of Varying AMD Volume

Table 3 (section 5.2) gives the metal uptakes for various resins using varying volumes of unoxidized AMD (1.5, 3.0, 5.0 mL). The general trend was that for increasing volumes of AMD, the metal uptake in mmol metal to mmol functional group (or mmol/g resin) increased for all three metals studied (iron, zinc, and magnesium). This trend would be expected since lower volumes do not contain enough metal ions to saturate the polymer chelating sites (functional groups). For increasing volumes of AMD, the chelating sites became increasingly occupied and the number of available sites were consequently decreased relative to the amount of ions in solution.

6.3 Uptake of Metals and Selectivity

The resins were evaluated using the calculated selection factor, $S_{Zn/Fe}$. The following tables rank the resins with regard to their selection factor. Table 8 ranks the resins which were tested using the unoxidized AMD, while table 9 ranks the resins which were tested using the oxidized AMD. (Data originally from Tables 3, 4, 7, sections 5.2, 5.3, 5.6). The symbol df is "degree of functionalization". The asterisks indicate an extremely high $S_{Zn/Fe}$, whose exact value is somewhat uncertain.

TABLE 8

Ranking of Resins Based on Selection Factor ($S_{Zn/Fe}$)
Unoxidized AMD
5 mL AMD used, 6 hour equilibrium time

| Resin | Structure of Functional Group | df (mmol/g) | $S_{Zn/Fe}$ | $C_{Zn}/C_{Fe}$ | $C_{Zn}$ mmol/ mmol fg | $C_{Fe}$ mmol/ mmol fg |
|---|---|---|---|---|---|---|
| 20 | 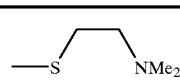 | 0.11 | 87* | 36 | 6.2 | 0.17 |
| 26 | 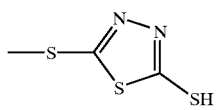 | 0.81 | 42* | 18 | 0.32 | 0.02 |
| 25 | 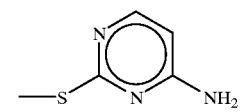 | 0.28 | 37* | 15 | 0.73 | 0.05 |

TABLE 8-continued

Ranking of Resins Based on Selection Factor ($S_{Zn/Fe}$)
Unoxidized AMD
5 mL AMD used, 6 hour equilibrium time

| Resin | Structure of Functional Group | df (mmol/g) | $S_{Zn/Fe}$ | $C_{Zn}/C_{Fe}$ | $C_{Zn}$ mmol/ mmol fg | $C_{Fe}$ mmol/ mmol fg |
|---|---|---|---|---|---|---|
| 19 | —S–CH(SH)–CH(SO$_3^-$Na$^+$) | 1.15 | 12 | 5.0 | 0.56 | 0.11 |
| 1 | —S–CH(NH$_2$)–COOH | 0.4 | 1.0 | 4.2 | 0.27 | 0.07 |
| 11 | Ps–CH=CH$_2$ | 3.43 | 7.4 | 3.1 | 0.07 | 0.02 |
| 4 | —S–CH$_2$CH$_2$–S–CH$_2$CH$_2$–SH | 1.40 | 4.2 | 1.7 | 0.28 | 0.17 |
| 2 | —S–CH$_2$–CH(NH$_2$)–C(=O)–O–Et | 1.0 | 3.7 | 1.6 | 0.29 | 0.19 |
| 17 | —S–(triazole)–NH$_2$ | 0.56 | 3.6 | 1.5 | 1.02 | 0.68 |
| 10 | —S–CH$_2$–CH(NH$_2$)–C(Ph)(Ph)–OH | 1.23 | 3.6 | 1.5 | 0.29 | 0.19 |
| 23 | —S–CH$_2$CH$_2$–SO$_3^-$Na$^+$ | 0.12 | 3.3 | 1.4 | 5.1 | 3.6 |
| 16 | Ps–CH=CH$_2$ | 2.29 | 2.8 | 1.2 | 0.31 | 0.26 |
| 18 | —S–(triazole)–NH$_2$ | 1.93 | 2.5 | 1.1 | 0.54 | 0.51 |
| 3 | —S–CH$_2$–CH(NH$_2$)–COOH | 1.48 | 2.5 | 1.0 | 0.24 | 0.24 |

TABLE 8-continued

Ranking of Resins Based on Selection Factor ($S_{Zn/Fe}$)
Unoxidized AMD
5 mL AMD used, 6 hour equilibrium time

| Resin | Structure of Functional Group | df (mmol/g) | $S_{Zn/Fe}$ | $C_{Zn}/C_{Fe}$ | $C_{Zn}$ mmol/ mmol fg | $C_{Fe}$ mmol/ mmol fg |
|---|---|---|---|---|---|---|
| 8 | 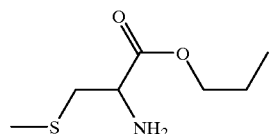 | 0.55 | 2.1 | 0.9 | 0.34 | 0.39 |
| 6 | 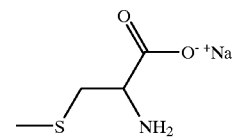 | 0.65 | 2.1 | 0.9 | 0.28 | 0.32 |
| 13 | Ps—$SO_3^{-+}Na$ (commercial Dowex 50W-X8) | 6.27 | 1.6 | 0.7 | 0.07 | 0.10 |
| 5 | 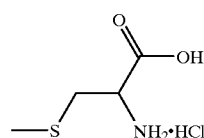 | 1.0 | 1.6 | 0.7 | 0.23 | 0.36 |
| 7 | 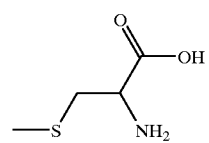 | 1.23 | 1.5 | 0.6 | 0.26 | 0.41 |
| 12 | Ps—$SO_3^{-+}Na$ (commercial Dowex 50W-X8) | 1.7 | 1.4 | 0.6 | 0.37 | 0.66 |
| 15 | Ps—COOH (commercial Amberlite) | NA | 1.4 | 0.6 | NA | NA |
| 21 | 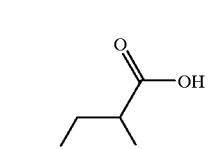 | 0.38 | 1.1 | 0.4 | 0.78 | 1.77 |
| 9 |  | 0.7 | 1.1 | 0.5 | 0.29 | 0.66 |
| 14 | Ps—$CH_2NMe_3^{+-}Cl$ (commercial Amberlyst) | NA | 0.7 | 0.3 | NA | NA |

TABLE 8-continued

Ranking of Resins Based on Selection Factor ($S_{Zn/Fe}$)
Unoxidized AMD
5 mL AMD used, 6 hour equilibrium time

| Resin | Structure of Functional Group | df (mmol/g) | $S_{Zn/Fe}$ | $C_{Zn}/C_{Fe}$ | $C_{Zn}$ mmol/ mmol fg | $C_{Fe}$ mmol/ mmol fg |
|---|---|---|---|---|---|---|
| 24 | 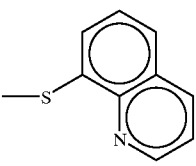 | 0.01 | 0.6 | 0.3 | 12 | 46 |
| 22 | 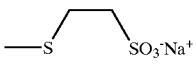 | 0.32 | 0.5 | 0.2 | 0.17 | 0.77 |

TABLE 9

Ranking of Resins Based on Selection Factor ($S_{Zn/Fe}$)
Oxidized AMD
5 mL AMD used, 6 hour equilibrium time

| Resin | Structure of Functional Group | df (mmol/g) | $S_{Zn/Fe}$ | $C_{Zn}/C_{Fe}$ | $C_{Zn}$ mmol/ mmol fg | $C_{Fe}$ mmol/ mmol fg |
|---|---|---|---|---|---|---|
| 20 | 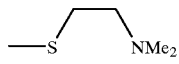 | 0.11 | 50* | 21 | 5.9 | 0.28 |
| 26 | 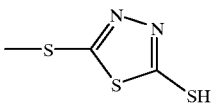 | 0.81 | 45* | 19 | 0.34 | 0.02 |
| 25 | 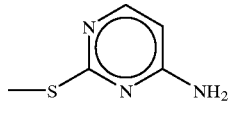 | 0.28 | 29* | 12 | 0.57 | 0.05 |
| 17 | 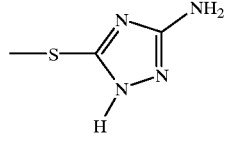 | 0.56 | 16 | 6.8 | 0.92 | 0.14 |
| 2 | 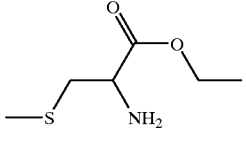 | 1.0 | 13 | 5.3 | 0.28 | 0.05 |
| 18 | 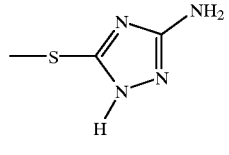 | 1.93 | 8.4 | 3.5 | 0.56 | 0.16 |

TABLE 9-continued

Ranking of Resins Based on Selection Factor ($S_{Zn/Fe}$)
Oxidized AMD
5 mL AMD used, 6 hour equilibrium time

| Resin | Structure of Functional Group | df (mmol/g) | $S_{Zn/Fe}$ | $C_{Zn}/C_{Fe}$ | $C_{Zn}$ mmol/ mmol fg | $C_{Fe}$ mmol/ mmol fg |
|---|---|---|---|---|---|---|
| 8 | —S—CH(NH$_2$)—C(=O)—O—propyl (cysteine propyl ester) | 0.55 | 7.1 | 3.0 | 0.24 | 0.08 |
| 10 | —S—CH$_2$—CH(NH$_2$)—C(Ph)(Ph)—OH | 1.23 | 4.7 | 2.0 | 0.30 | 0.15 |
| 5 | —S—CH$_2$—CH(NH$_2$·HCl)—C(=O)—OH | 1.0 | 4.2 | 1.8 | 0.27 | 0.15 |
| 12 | Ps—SO$_3^-$ $^+$Na (commercial Dowex 50X8-100) | 1.7 | 4.0 | 1.7 | 0.30 | 0.18 |
| 11 | Ps—CH=CH$_2$ | 3.43 | 3.7 | 1.6 | 0.07 | 0.05 |
| 16 | Ps—CH=CH$_2$ | 2.29 | 2.8 | 1.2 | 0.35 | 0.30 |
| 23 | —S—CH$_2$CH$_2$—SO$_3^-$Na$^+$ | 0.12 | 2.3 | 1.0 | 5.5 | 5.6 |
| 19 | —S—CH$_2$—CH(SH)—SO$_3^-$ $^+$Na | 1.15 | 2.2 | 0.9 | 0.60 | 0.64 |
| 14 | Ps—CH$_2$NMe$_3^+$ $^-$Cl (commercial Amberlyst) | NA | 1.6 | 0.7 | NA | NA |
| 21 | —S—CH$_2$—C(=O)—O—CH$_2$CH$_2$CH$_2$CH$_2$—CH(O—C(=O)—CH$_2$—SH)—CH$_2$—O—C(=O)—CH$_2$—SH | 0.38 | 1.3 | 0.5 | 0.66 | 1.23 |
| 27 | Ps—CH$_2$—N(CH$_2$COOH)$_2$ | 0.7 | 0.8 | 0.3 | 0.76 | 2.36 |

TABLE 9-continued

Ranking of Resins Based on Selection Factor ($S_{Zn/Fe}$)
Oxidized AMD
5 mL AMD used, 6 hour equilibrium time

| Resin | Structure of Functional Group | df (mmol/g) | $S_{Zn/Fe}$ | $C_{Zn}/C_{Fe}$ | $C_{Zn}$ mmol/ mmol fg | $C_{Fe}$ mmol/ mmol fg |
|---|---|---|---|---|---|---|
|  | (commercial Chelex-100) |  |  |  |  |  |
| 9 | —S–CH₂–CH(NH₂)–C(=O)–OH | 0.7 | 0.8 | 0.3 | 0.32 | 0.99 |
| 22 | —S–CH₂–CH₂–SO₃⁻Na⁺ | 0.32 | 0.6 | 0.2 | 0.70 | 2.86 |
| 24 | —S–(8-quinolinyl) | 0.01 | 0.5 | 0.2 | 11 | 46 |

6.3 Uptake of Metals and Selectivity (cont'd)

The most selective resins were found to be 20, 26 and 25. As noted previously, due to the equilibrium iron concentrations being close to or possibly equal to the initial concentration within the limits of the measurement method (atomic absorption spectrometry), the $S_{Zn/Fe}$ values for these are uncertain. High $S_{Zn/Fe}$ values would mean that these three resins are extremely selective for zinc over iron. In order to verify this, the loaded resins (with adsorbed metals still on them) could have elemental analyses done on them to more accurately determine the metal uptake (particularly possible small amounts of iron) by measuring directly the metal content of the resin. This procedure will be included in future reports.

The predominant trend in comparing the selectivities of each resin when treated with AMD containing the slightly hard ferrous ion (unoxidized AMD) and when treated with the oxidized AMD (no ferrous ion, all iron existed as the harder ferric ion) was that the selectivity ($S_{Zn/Fe}$ value) tended to increase. In some cases this was quite significant. The top three resins (20, 26 and 25) did not specifically reflect this trend, but this may be due to the factors mentioned above, and elemental analysis of the spent resins will confirm whether oxidation of the ferrous ion to ferric ion is needed for good zinc selectivity.

The increase of selectivity ($S_{Zn/Fe}$) when the AMD was oxidized was significant for the following resins, with as much as a five-fold increase: 17, 18, 8, 2, 12 and 5. Resins 1 4, 10 and 21 showed slight increases in $S_{Zn/Fe}$ (2.3, 1.3 and 1.2-fold respectively).

Resins 22 and 24 had no significant changes in their selectivities, which were extremely low ($S_{Zn/Fe}$ less than 1). These results may be questionable due to the very low degrees of functionalization (0.32, and 0.01 respectively). Preparing resins with a greater degree of functionalization may give more definitive results.

As a control, polyDVB, the "non-chelating" precursor to the chelating resins, was also tested with two different degrees of functionalization.

Resin 16 had a df of 2.29 and resin 11 had a df of 3.43, consisting of "inert" vinyl groups. The $S_{Zn/Fe}$ for resin 16 was not affected by oxidation of the AMD solution ($S_{Zn/Fe}$ 2.8). This is expected; however, polyDVB should have extremely low capacities, which resin 16 did not have (see tables 8 and 9). Resin 11, on the other hand, had low capacities, but also had a high $S_{Zn/Fe}$ for the unoxidized AMD ($S_{Zn/Fe}$ 7.4). The $S_{Zn/Fe}$ for the oxidized AMD was similar to that of resin 16 ($S_{Zn/Fe}$ 3.7 for 11). Resin 11, several months old at the time of testing, may possibly have changed composition due to formation of hydroxyl or carboxyl functional groups through autooxidation of residual vinyls in a more aged resin. This change may have affected the results. Such oxidation will not be possible in a fully-functionalized resin, where residual vinyls would have been fully consumed. This hypothesis needs to be verified.

Some resins had a decrease in selectivity for zinc over iron when the AMD was oxidized. The resins, in order of largest to smallest decrease in $S_{Zn/Fe}$ are: 19, 11, 9, and 23. Resins 19 and 23 had a sulphonate group present. The decrease in selectivity for these two resins may be due to the extreme hardness of the sulphonate group (leading it to prefer Fe(III) over Fe(II) and Zn(II), though it would probably have the highest affinity for the very hard ions, Na⁺ or H⁺). The oxidation of the thiol of 19 with ferric ion or residual hydrogen peroxide to form another sulphonate group, may have also contributed to a decrease in selectivity, although this is unlikely.

As indicated by the "top three" resins (20, 26 and 25, whose $S_{Zn/Fe}$ were respectably high), it may be unnecessary to oxidize the AMD before treatment with the resins.

The commercial resins, 12, 13, 14, 15 and 27 had low selectivities, ($S_{Zn/Fe}$'s equal to 1.4, 1.6, 0.7, 1.4 respectively for unoxidized AMD, 27 was only tested using oxidized AMD, $S_{Zn/Fe}$ equal to 0.8). The selectivites of 12 and 14 increased with the use of oxidized AMD (to $S_{Zn/Fe}$ equal to 4.0 and 1.6 respectively). (Resins 13 and 15 were not tested with oxidized AMD.) Since resin 12 has a sulphonate functional group, it is not understood why the selectivity for zinc would increase upon use of oxidized AMD. In fact, as seen for the other sulphonate-containing resins (see above), the selectivity should favour higher iron uptakes. Resin 14 is an anion-exchange resin (having a cationic quaternary ammonium functional group), so it should not adsorb any cations. However, it will exchange its anion (chloride) for sulphate, which in turn can possibly bridge to a cationic metal ion. This phenomena could also occur for any amine- or amino-acid-containing functionalities, protonated under the acidic conditions of the tests. The selectivity of 27, as well as the capacity (see tables 4 and 9), favoured a strong iron uptake from oxidized AMD, as would be expected for a carboxylate-containing chelating group.

Resins 1 to 3 and 5 to 10 were all based on the amino acid cysteine. While they all had a selectivity for zinc, there is no obvious trend among these resins. The existence of hard carboxylic acid (—COOH) or hard ester (—COOR; may have been hydrolyzed to —COOH under conditions of exposure to AMD) functionalities, may have decreased the selectivity. This fact is verified by the reasonable selectivity of resin 10, which had a less hard hydroxyl group (—OH) instead of a carboxylic acid group ($S_{Zn/Fe}$ equals 3.6 and 4.7 for the unoxidized and oxidized AMD solutions respectively). It should be noted, however, that for the carboxylic acid-containing resins, the selectivity tended to increase for the oxidized AMD. As ferric ion is harder than ferrous ion, this increase in selectivity is not expected and we have no theory at this time. However, in any case, resins with oxygen-containing ligands will be avoided in the future for this application.

Since the selectivity of resin 20 was so good, future resins could be based on the aminoethanethiol functionality and derivatives thereof. The syntheses of these ligands, as mentioned in section 4.1c, will be advantageous in this work.

The presence of a sulphonate group (—$SO_3$—), as in resins 19, 22, 23, and the commercially-available 12 and 13, will make the resin more water-swellable, which can increase the efficiency of the resin. The resins mentioned were generally selective for zinc, with the exception of 22, which may change with an increase in the degree of functionalization. That test will be done in the future. As mentioned previously, resin 12 had an increase in selectivity for zinc with the oxidized AMD. The functional groups of resins 19 and 23 differ only by the presence of another thiol group (19) (see Table 8). Both are selective for zinc, but 19 is much more so ($S_{Zn/Fe}$'s equal 12 and 3.3 respectively for 19 and 23, unoxidized AMD). As would be expected, the selectivity for zinc decreased upon use of the oxidized AMD for resins 19 and 23 ($S_{Zn/Fe}$'s equal to 2.2 and 2;3). To develop a more complete understanding of the effect of an extra thiol, or the presence of a sulphonate, other resins containing the functional group —$SCH_2CH_2SH$ should be studied in the future. This resin should not perform as well as 19 if the presence of a sulphonate has any effect on chelation.

In the two sulphonate-containing commercial resins (12 and 13), the sulphonate group is attached directly to the aryl group, whereas in the other resins (19, 22, and 23), the sulphonate group is not directly bonded to the aryl group, but is 6 or 7 atoms away, linked via —$CH_2CH_2SCH_2CH_2$—$SO_3^-$ (23) or —$CH_2CH_2SCH_2CH_2CH_2$—$SO_3^-$ (19, 22). This places the chelating group further away from the polymer backbone, allowing easier access for ions.

Another aspect to study further is that of the chelate bite size, whether the chelate, if bidentate (attaches by two sites in the ligand), forms a four, five, or six-membered ring when chelating the metal. To form a four-membered ring, the ligand has to have the two atoms involved in the metal-ligand bonds spaced apart by one other atom (a one-atom-spacer). A group such as $HSCH_2SH$ is an example (though it would be chemically unstable; stable C—S—C—H is found in resin 26 though). To form a five-membered ring, a group needs a two-atom-spacer, such as $HSCH_2CH_2SH$. For a six-membered ring, a three-atom-spacer is needed, such as $HSCH_2CH_2CH_2SH$.

Examples of resins with chelating groups having one atom spacers are 17, 25, and 26.

Examples of resins having chelating groups with two atom spacers are 4, 19, 20, 23, 24, 27 and the cysteine-based resins (1–3, 5–10).

An example of a resin with a chelating group having a three atom spacer is 23, if it behaves as a bidentate ligand (attaching to a metal through the sulphide and an oxygen on the sulphonate group).

In the future, more work on analogs, based on the ring size of the complex, will be done.

Of related interest, analogs of some of the more successful resins, such as 17,19, 20, 25, and 26 will be studied. They may be closely related, varying by substitution of a group or atom, for example, an amine for a thiol, or other nitrogen or sulphur-containing entities. One analog of 20 to be studied is 28 (—$SCH_2CH_2NH_2$). Analogs of 17, 19, 24, 25, and 26 are also of interest. One possibility is to study the effect of the substitution of the sulphur by a nitrogen in the ring of the group from 26; another possibility is to study the effect of replacing the amine by a thiol in 25. The effects of ligands containing mostly sulphur, some sulphur and some nitrogen, or mostly nitrogen will be contrasted. The effect of ring-containing ligands will be studied: 30, 32, 33, 36, 37. Ligands which are multidentate, ringed structures will also be studied; examples are sulphur or nitrogen-containing analogs of crown ethers (36).

Using the episulphide synthesis to form aminoethanethiols (section 4.1c), it will be possible to synthesize chelants which may not be presently commercially-available, but which would still be simple to manufacture. These synthesized chelants could then be attached to a polymer backbone using the method used in this study.

Zinc ion tends to form tetrahedrally-coordinated complexes, so it is of interest in the future to find possible sulphur and nitrogen-containing ligands which can exist in a tetrahedral conformation.

The first, second, and fourth ranked resins (resins 20, 26, and 19 respectively, unoxidized AMD test) are all derived from known chelating agents. They all had excellent selectivity for zinc over iron, (other "heavy metals" not analyzed so far in this study may have been adsorbed as well). These resins outperformed the commercial resins studied in terms of selectivity for zinc (see Tables 8 and 9). These results are quite promising, and further work will be done in this direction. Resins 21 and 24, also based on known chelating groups, did not perform as well as hoped; like cysteine esters, 21 may have been hydrolyzed under aqueous acid conditions, here to a much poorer (no —SH functionalities present) chelator for zinc.

It was found that for some resins (17, 20, 21, 22, 23, 24, and 27) the stoichiometry of metal to ligand (capacity in terms of mmol metal/mmol functional group, see tables 3, 4, 8, 9) was greater than one, meaning that more than one metal binds to one functional group. While this can be possible, the numbers are generally low (2, 3) but higher numbers were seen. This may be due formation of multi-centre bridging or metal cluster formation, but these results should be confirmed. Each functional group may have also had more than one possible binding site, (eg. S, N, O) which could have acted independently, binding more than one metal to each functional group. The low degrees of functionalization may also have affected the results.

The wettability of the resins was also observed (see table 6). Most were partly wettable. 26, a highly selective resin, was not wettable. By introducing hydrophilic groups (sulphonate) onto the resin, either as part of the chelating group, or as a separate entity, the wettability and swellability of the resins will improve. This in turn will improve the uptake of zinc, maximizing the resin efficiency.

The details of this introduction of sulphonate groups have not been worked out yet, but there has been much work done on this topic over the years globally. It should be possible to introduce the sulphonate groups either before, concurrent with, or after functionalization of the polyDVB, either through radical functionalization using mercaptoalkylsulphonates, (the technique used in this study), or by standard electrophilic sulphonation.

Two resins, 19 and 20, previously treated with AMD were regenerated by soaking for a few hours in 4 molar sulphuric acid (see table 5). More than 80% recovery of the zinc from the loaded resins was possible. Further tests will include determining the removal of other adsorbed metal ions, as well as determining any changes to the resin. Other methods of regeneration will be explored, such as washing with distilled water, with solutions of chelating agents such as EDTA or DTPA, with hydrochloric acid, and with brine.

Most resins had some uptake of magnesium (see tables 3 and 4). This is undesirable and steps will be taken to minimize magenesium uptake by better selection of chelating groups. The selection factor for zinc over magnesium will also be calculated in future.

6.4 Application

A schematic diagram (FIG. 4) of a proposed treatment process using chelating resins is included. Essentially, there are three stages:

1. Production of the resin by a commercial chemical manufacturer,

2. Application of the resin at the AMD site, and

3. Regeneration of the resin with metals recovery, done either at the AMD site (if sufficient inexpensive electricity is available) or at an appropriate refinery.

One possible scenario is to load resin particles into inert plastic (polypropylene) mesh bags, which would be lowered into the AMD pond/waste stream and allowed to become saturated with metal ions, then pulled out and either washed with eluent, or dried in the sun and transported elsewhere for elution/regeneration.

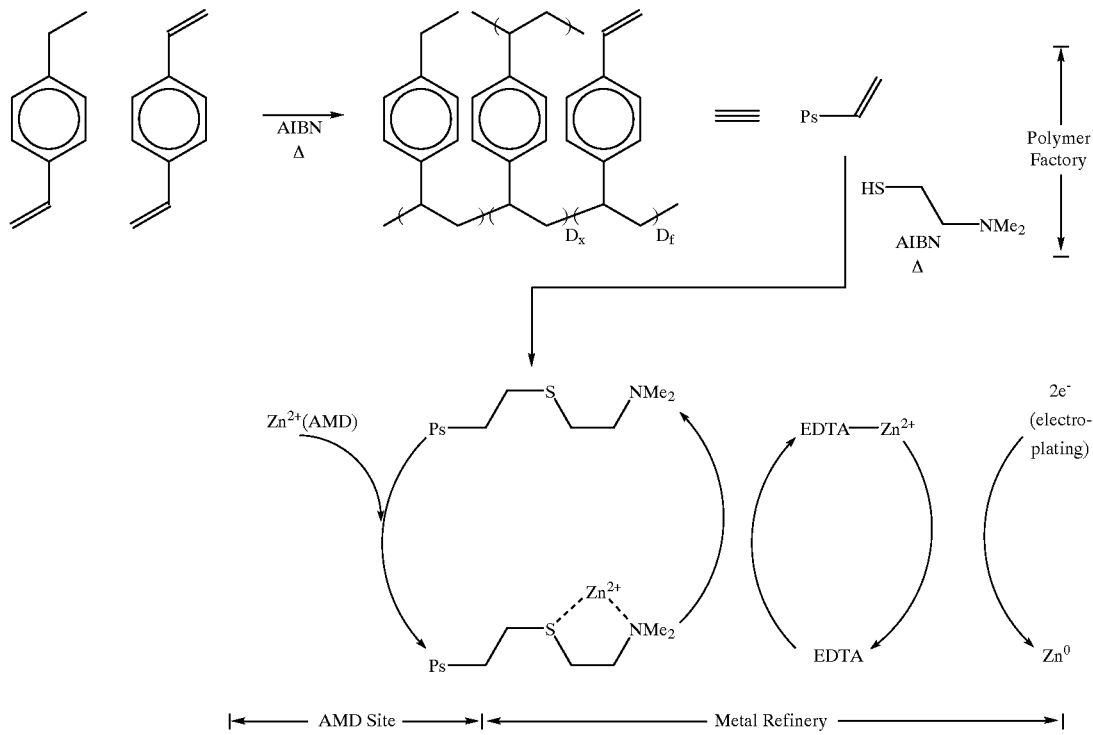

Figure 4: Preparation & Application of Chelating Resins

Another option is to place the metal-loaded resin into vats of chelant solution and perform simultaneous leaching and electrolysis to plate out the metal(s). This method has not been investigated yet in this laboratory, but has been done elsewhere [15]. It could be done either on- or off-site. The bag of leached resin could then be dumped back into the AMD pond for re-use. Removal of metal contaminants from an AMD solution also makes it easier to recover sulphuric acid as a by-product through electro-osmosis.

It may also be possible to make the polymer into other forms, using variations of established techniques, such as the manufacture of hollow fibres or membranes, and the established methods of application would then be possible.

6.5 Future Work

Future work will be done in the following areas: design and synthesis of resins, testing of resins, and possible costs and application.

Synthesis and Characterization of Resins:

Synthetic work will include:

a) attempting to maximize the degree of functionalization, by varying reaction conditions, such as solvent used, or amount of residual vinyl groups in the poly(DVB), b) the synthesis of aminoethanethiols to be used as the chelating groups, c) other possible chelants will be investigated. As mentioned previously, analogues of successful chelating groups will be studied.

Characterization of the resins will include particle size analysis, infrared spectroscopic analysis to study the chelating groups, and elemental analysis to determine the degree of functionalization. Surface area and pore size measurements may also be made.

After selection of the chelating group (or groups) is made, following the further experimental work mentioned previously, other variables will be studied, including the effect of pore size, surface area, particle size, and degree of functionalization.

Detailed characterization of the resins will include complete elemental analysis to measure the degree of functionalization, the metal uptake, and any changes to the used resins. The stability of the functional groups will be studied after exposure to the AMD or sulphuric acid, as well as after regeneration, using both elemental analysis and infrared spectroscopy.

A scale-up (small scale reactor) synthesis will also be done for selected resins.

Testing of Resins for Metal Uptake:

In order to study the total metal uptake and selectivity for zinc by the resins made, the uptake of all of the metals present in AMD will be studied using atomic absorption spectrometry and elemental analysis.

Using solutions with various concentrations of individual metals, the maximum capacity for each metal will be found. Solutions of synthetic AMD will be used to measure the distribution coefficients and selection factors, which are both solution dependent.

Testing methods will use larger quantities of resins, preconditioned with sulphuric acid (pH 2, similar to that of the AMD solution), exposed to a large excess of AMD or metal-containing acidic solutions. Atomic adsorption spectrometry as well as elemental analysis will be used to measure the metal uptakes. Other established test methods will be employed.

Methods of regeneration will also be examined. These include elution with distilled water, various acids, solutions of chelants or extractants (like those used in hydrometallurgy), and electroelution.

A cost analysis will be done at a later point, though it would appear that 26 and some variations of 20 might be inexpensive.

7. Conclusions

These exploratory investigations using synthetic chelating resins have shown that certain specific polymer-supported functional groups can serve to selectively recover zinc from acid mine drainage. Further investigations should enable the development of resins with higher metal uptake capacity for the maximum recovery of zinc, while leaving iron in solution. This route holds the promise of economical detoxification of Acid Mine Drainage, along with the profitable recovery of zinc and related metals.

8. References

1. G. M. Ritcey, Tailings Management, Elsevier, Amsterdam (1989).
2. R. J. C. MacDonald, P. D. Kondos, S. Krevier, P. Rulinsky, N. Wassalouf, "Generation of and disposal options for Canadian mineral industry effluent sludges". In *Tailings and Effluent Management*. Editors, M. E. Chalkley, B. R. Conard, V. I. Lakshmanan, K. G. Wheeland. Pergamon Press (1989), pp. 139–197.
3. S. R. Rao, R. Gehr, M. Riendeau, D. Lu, J. A. Finch, "Acid Mine Drainage as a Coagulant". *Minerals Eng.*, 5 (9), 1011 (1992).
4. S. R. Rao and J. A. Finch, "Resource recovery from acid mine drainage". In *Waste Processing and Recycling in Mining and Metallurgical Industries*. Editors, S. R. Rao, L. N. Amaratunga, D. A. D. Boateng, M. E. Chalkley. CIM (1992), pp. 3–11.
5. B. A. Bolto and L. Pawlowski, *Wastewater Treatment by Ion-Exchange*. E. & F. N. Spon, New York (1987).
6. S. R. Rao and J. A. Finch, "A review of water re-use in flotation". *Minerals Eng.*, 2 (1989), pp. 65–85.
7. J. Holmes and E. Kreusch, *Acid Mine Drainage Treatment by Ion Exchange*. U.S. Environmental Protection Agency, Washington, D.C. (1972).
8. B. E. Holbein and A. Blais, "Heavy metal recovery from industrial waste with metal selective adsorbents and high efficiency electrolytic cells". *Proceedings 12th International Symposium on Wastewater Treatment.* pp. 55–76, AQTE, Montreal (1989).
9. B. E. Holbein and M. J. Noakes, "The use of Aurosave adsorption process for gold and precious metals". *Proc. Aust. Inst. Mining Eng.* (1988).

8. References (cont'd)

10. K. M. Mackay and R. A. Mackay, *Introduction to Modern Inorganic Chemistry.* pp. 200–201. Prentice Hall (1989).
11. W. G. Levine, ed. *The Chelation of Heavy Metals.* Oxford: Pergamon Press, 1979.
12. J. P. Gao, F. G. Morin, G. D. Darling, "Functional Polymers Containing Dimethylene Spacers. Characterization by Solid-Phase $^{13}$C—NMR," *Macromolecules*, 26, 1196, (1993).
13. M. Bartholin, G. Boissier, J. Dubois, "Styrene-Divinylbenzene Copolymers, Revisited IR Analysis," *Makromol. Chem*, 182, 2075, (1981).
14. R. Luhowy, F. Meneghini, "An Improved Synthesis of Aminoethanethiols," *J. Org. Chem.*, 38, (13), 2405, (1973).
15. A. H Martins, "The Extraction of Gold and Silver By Electroelution of Strong-Base Polymeric Resins", *Can. Metallurgical Quarterly*, 32 (1), 85 (1993).

We claim:

1. Chelating resins for use in selectively binding heavy metals, having the structure

where Ps represents a copolymer of a poly(divinylbenzene), and R represents an organic radical having a coordinating ability containing at least one N and/or S atom but not a —COH or —COOH group, that is bound to the S atom, SR being attached to Ps through an ethylene group, and wherein R is further selected from:

(a) $(CH_2)_m X$, where m is selected from among 2, 3 and 4, and X is selected from among $SO_3$— and NR'R", where R' and R" are selected from among hydrogen, methyl, ethyl, propyl, isopropyl, butyl, isobutyl, tert-butyl and $[(CH_2)_d A]_e (CH_2)_f B$ where d is selected from among 2, 3 or 4, A is selected from among O, S or NH, e is selected from 0 to 10, f is selected from among 2, 3 or 4, and B is selected from H, OCH₃, SH, SCH₃, NH₂ or NHCH₃, or so that R'R" is of the form [(CH₂)$_a$Z]$_b$(CH₂)$_c$, where Z is selected from among O, S or NH, a is selected from among 2, 3 and 4, b is selected from between 0 and 6, and c is selected from among 2, 3, 4 and 5;

(b) [(CH₂)$_m$X']$_n$ (CH₂)$_p$Y, where m is selected from among 2, 3 and 4, X' is selected from O, S or NH, n is selected from 1 to 10, p is selected from 1 with Y=H, or from 2, 3, 4, or 5 with Y selected from H, SR' or NR'R", where R' and R" are selected as in (a) herein;

(c) [(CH₂)$_m$X']$_g$(CH₂)$_h$Y', where m is selected from 2, 3 or 4, X' is selected from among S, O or NH, g is selected from 0 to 10, h is selected from 0 to 4, and Y' is a 5-membered aromatic ring containing one of O, S or NH as part of the ring, and whose other four atoms that are also part of the ring are selected from sp²-hybridized =N— or =C<, so that in the functional group Ps—CH₂CH₂—S[(CH₂)$_m$X]$_g$(CH₂)$_h$Y' there is at least one heteroatom selected from O, except OH, S or N, that is connected through no more than 3 intervening atoms to the aromatic ring at a carbon that is either adjacent to a ring heteroatom selected from S, O and =N—, except NH unless it can readily tautomerize to =N—, or to a carbon that is connected through no more than 3 intervening atoms to a substituent heteroatom selected from S, O, except OH, and N;

(d) [(CH₂)$_m$X']$_g$(CH₂)$_h$Y", where m is selected from 2, 3 or 4, X is selected from among S, O or NH, g is selected from 0 to 10, h is selected from 0 to 4, and Y" is a 6-membered aromatic ring whose six atoms that are part of the ring are selected from sp²-hybridized =N— or C—, so that in the functional group Ps—CH₂CH₂—S[(CH₂)$_m$X]$_g$(CH₂)$_h$Y" there is at least one heteroatom selected from O, except OH, S or N, that is connected through no more than 3 intervening atoms to the aromatic ring at a carbon that is either adjacent to a ring heteroatom selected from S, O and =N—, except NH unless it can readily tautomerize to =N—, or to a carbon that is connected through no more than 3 intervening atoms to a substituent heteroatom selected from S, O, except OH, and N; and (e) [(CH₂)$_m$X']$_g$(CH₂)$_h$Y"', where m is selected from 2, 3 or 4, X is selected from among S, O or NH, g is selected from 0 to 10, h is selected from 0 to 4, and Y"' is a binuclear aromatic ring system composed of 2 fused 6-membered rings whose 10 atoms that are part of the rings are selected from sp²-hybridized =N— or =C—, so that in the functional group Ps—CH₂CH₂—S[(CH₂)$_m$X']$_g$(CH₂)$_h$ Y"' there is at least one heteroatom selected from O, but not OH, S or N, that is connected through no more than 3 intervening atoms to the aromatic ring at a carbon that is either adjacent to a ring heteroatom selected from S, O and =N—, but not NH unless it can readily tautomerize to =N—, or to a carbon that is connected through no more than 3 intervening atoms to a substituent heteroatom selected from S, O, but not OH, and N.

(f) (CH₂)$_m$CHA(CH₂)$_n$B, where m is selected from 1 to 10, n is selected from 1 to 10, and where A and B are selected from SH or SO₃—, whereby if A is SH, said resin may contain some groups R=CH[(CH₂)$_m$SH][(CH₂)$_n$B], and if B is SH, said resin may also contain groups R=(CH₂)$_n$CHA(CH₂)$_m$SH.

(g) CH₂COO(CH₂)$_m$CHA(CH₂)$_n$A, where m is selected from 1 to 10, n is selected from 1 to 10, and A is OOCCH₂SH, whereby said resin may also contain some groups R selected from CH₂COOCH[(CH₂)$_m$A][(CH₂)$_n$A] or CH₂COO(CH₂)$_n$CHA(CH₂)$_m$A.

2. Chelating resins as claimed in claim 1 wherein R is selected from part (a) of claim 1, m=2, x=N, and R'=R"=methyl.

3. Chelating resins as claimed in claim 1 wherein R is selected from part (a) of claim 1, m=2 or 3, and X=SO₃—.

4. Chelating resins as claimed in claim 1 wherein R is selected from part (a) of claim 1, X=N, R'R"=[(CH₂)$_a$Z]$_b$(CH₂)$_c$ wherein a=2, b=2, c=2 and Z=NH.

5. Chelating resins as claimed in claim 1 wherein R is selected from part (b) of claim 1, m=2, X'=S, n=1, p=2, Z=S and R'=H.

6. Chelating resins as claimed in claim 1 wherein R is selected from part (b) of claim 1, m=2, x=NH, n=1, p=2, Z=N and R'=R"=H.

7. Chelating resins as claimed in claim 1 wherein R is selected from part (b) of claim 1, m=2, X=NH, n=2, p=2, Z=S and R=H.

8. Chelating resins as claimed in claim 1 wherein R is selected from part (b) of claim 1, m=2, X=NH, n=2, p=2, Z=N and R'=R"=H.

9. Chelating resins as claimed in claim 1 wherein R is selected from part (c) of claim 1, g=0, h=0, and the 5-membered aromatic ring Y' consisting of: S, C substituted with Ps—CH₂CH₂—S, N, N, and C substituted with SH, at positions 1 to 5 respectively.

10. Chelating resins as claimed in claim 1 wherein R is selected from part (c) of claim 1, g=0, h=0, and the 5-membered aromatic ring Y' consisting of, in one possible tautomer form: N substituted with H, N, C substituted with NH₂, N, and C substituted with Ps—CH₂CH₂—S, at positions 1 to 5 respectively.

11. Chelating resins as claimed in claim 1 wherein R is selected from part (d) of claim 1, g=0, h=0, and the 6-membered aromatic ring consisting of: N, C substituted with Ps—CH₂CH₂—S, N, C substituted with NH₂, C substituted with H, and C substituted with H, at positions 1 to 6 respectively.

12. Chelating resins as claimed in claim 1 wherein R is selected from part (d) of claim 1, m=2, X=NH, g=1, h=1, and the 6-membered aromatic ring consisting of: N, C substituted with Ps—CH₂CH₂—SCH₂, C substituted with H, C substituted with H, C substituted with H, C substituted with H, at positions 1 to 6 respectively.

13. Chelating resins as claimed in claim 1 wherein R is selected from part (d) of claim 1, m=2, X=NH, g=1, h=0 and the 6-membered aromatic ring consisting of: C substituted with Ps—CH₂CH₂—SCH₂CH₂NH, C substituted with NH₂, C substituted with H, C substituted with H, C substituted with H, and C substituted with H, at positions 1 to 6 respectively.

14. Chelating resins as claimed in claim 1 wherein R is selected from part (e) of claim 1, g=0, X=NH, h=0, and the binuclear aromatic ring system consisting of: N, C substituted with H, C substituted with H, C substituted with H, C substituted with H, C substituted with H, C substituted with H, and C substituted with Ps—CH₂CH₂—S, at positions 1 to 10 respectively.

15. Chelating resins as claimed in claim 1 wherein R is selected from part (a) of claim 1, m=2, X=N and R'=R"=H.

16. The chelating resins of claim 1 when in the form of any solid, swellable, hollow, channel-containing or porous beads, fibres, blocks or membranes.

17. Chelating resins as claimed in claim 1 wherein R is selected from part (f) of claim 1, m=1, n=1, A=SH and B=SO₃—.

18. Chelating resins as claimed in claim 1 wherein R is selected from part (g) of claim 1, m=1, and n=4.

* * * * *